United States Patent
Venkatasubramanian et al.

(10) Patent No.: US 7,003,765 B1
(45) Date of Patent: Feb. 21, 2006

(54) COMPUTER-BASED PRE-EXECUTION ANALYSIS AND VERIFICATION UTILITY FOR SHELL SCRIPTS

(75) Inventors: Vasundhara Venkatasubramanian, Chrompet (IN); Ramnathpura K. Subramanya, Malleswaram (IN)

(73) Assignee: Oracle International Corporation, Redwood Shores, CA (US)

( * ) Notice: Subject to any disclaimer, the term of this patent is extended or adjusted under 35 U.S.C. 154(b) by 718 days.

(21) Appl. No.: 10/020,088

(22) Filed: Dec. 12, 2001

(51) Int. Cl.
*G06F 9/45* (2006.01)

(52) U.S. Cl. .................. 717/143; 717/140; 717/141

(58) Field of Classification Search ............. 717/140, 717/141, 143

See application file for complete search history.

(56) References Cited

OTHER PUBLICATIONS

CCsh, "The Bourne Shell Compiler", Comeau Computing, Jun. 10, 1999, http://www.comeaucomputing.com/faqs/ccshlit.html.*

* cited by examiner

*Primary Examiner*—Tuan Dam
*Assistant Examiner*—Chih-Ching Chow
(74) *Attorney, Agent, or Firm*—Hickman Palermo Truong & Becker LLP

(57) ABSTRACT

A method and apparatus for verifying shell scripts is provided. According to one aspect of the invention, prior to executing a shell script, one or more syntactic verification checks are performed on the shell script that verify conformance of the shell script to a set of syntactic guidelines. In addition, still prior to executing the shell script, one or more semantic verification checks are performed on the shell script that verify conformance of the shell script to a set of semantic guidelines. Still further, the method and apparatus may also include steps for, prior to executing the shell script, performing one or more coding organizational guideline verification checks that verify conformance of the shell script to a set of one or more coding organizational guidelines.

20 Claims, 6 Drawing Sheets

601 AUTOMATIC HEADER GENERATION

FIGURE 6

701 COMMAND LINE OPTION

FIGURE 7

COMPUTER-BASED PRE-EXECUTION ANALYSIS AND VERIFICATION UTILITY FOR SHELL SCRIPTS

FIELD OF THE INVENTION

The present invention relates generally to computer software, and more specifically to a computerized utility for shell script pre-execution analysis and verification.

BACKGROUND OF THE INVENTION

Shell scripts are often used in various operating systems to automate the execution of functions that are performed by an operating system shell. The shell is the operating system's command interpreter and the set of commands used to communicate with the system. A shell script is a text file that contains a sequence of commands for an operating system, for example a UNIX-based operating system. The term shell script is used because it combines into a single file a sequence of commands that would otherwise have to be entered into the system from a keyboard one at a time.

In general, a shell script is typically created for command sequences for which a user has a repeated need. A sequence of commands that is associated with a shell script can be initiated by simply entering the name of the shell script in a command line. For example, in UNIX, the shell acts as an interpreter that executes each command line within a shell script by line.

A technique for identifying errors in a shell script is through the use of the sh -n command. If there are syntactic errors in a shell script, checking syntactic correctness of a shell script may be performed by using the shell command sh-n.

However, drawback with using the "sh-n" command is that even though it reports syntactic errors, a syntactically correct script may still incur errors when executed. For example, a shell script that is syntactically correct may still have semantic problems. This can cause execution failures when the shell scripts are executed. The ramifications of such errors can be unpredictable, including abnormal hang/termination of the shell script.

Another technique for errors in shell scripts is through manual checking of all the commands in the file to determine whether there could be potential sources of bugs. This method of manual checking including code walk through/inspections and unit testing is the only means available for detecting such problems before executing a script. In this method all the commands in the file are checked manually to see whether there could be potential sources of bugs. A drawback to this method of error detection is that it requires manual error checking by a human. The potential for error is significant using this method as all the problems may not be identified with manual checking of shell scripts.

Yet another error detection technique for shell scripts is to run the shell script to determine if there are errors. A drawback with running a script to determine whether there are errors is that running a shell script can often change environment variables during execution. Environment variables are special variables which maintain data regarding information such as the users' login directory, terminal type, or mailbox location. For example, when a program is executed in a UNIX environment, UNIX passes the values of all the environment variables to the shell. Therefore, a drawback to this method of error checking is that running the shell scripts often changes the environment variables, and executing the script has an immediate and sometimes deleterious effect on the environment.

Based on the foregoing, it is highly desirable to have a shell script verification mechanism that can perform increased error checking on shell scripts over traditional techniques. Furthermore, it is highly desirable to provide a shell script verification mechanism that can perform advanced error checking without actually executing the script.

SUMMARY OF THE INVENTION

A method and apparatus for verifying shell scripts is provided. According to one aspect of the invention, prior to executing a shell script, one or more syntactic verification checks are performed on the shell script that verify conformance of the shell script to a set of syntactic guidelines. In addition, still prior to executing the shell script, one or more semantic verification checks are performed on the shell script that verify conformance of the shell script to a set of semantic guidelines. Still further, the method and apparatus may also include steps for, prior to executing the shell script, performing one or more coding organizational guideline verification checks that verify conformance of the shell script to a set of one or more coding organizational guidelines.

Embodiments of the invention may also be performed through the use of computer-readable mediums and data signal applications.

BRIEF DESCRIPTION OF THE DRAWINGS

The pre-execution analysis and verification utility of the present invention will now be illustrated by way of example, and not by way of limitation, in the figures of the accompanying drawings in which like reference numerals refer to similar elements and in which:

FIG. 6 is a high-level block diagram of an embodiment illustrating an automatic header generation module;

FIG. 7 is a high-level block diagram of an embodiment illustrating a command-line option module.

DETAILED DESCRIPTION OF THE PREFERRED EMBODIMENT

Figure 1:
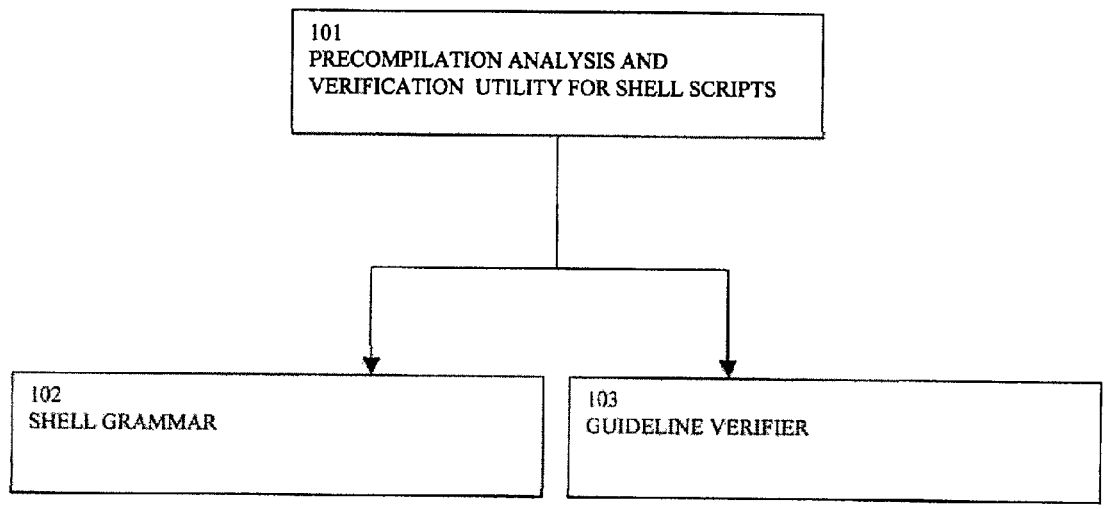
FIG. 1 is a high-level block diagram of an embodiment illustrating the various modules in the pre-execution analysis and verification utility for shell scripts.

In the following description, for the purposes of explanation, numerous specific details are set forth in order to provide a thorough understanding of the present invention. It will be apparent, however, to one skilled in the art that the present invention may be practiced without the specific details. In other instances, structures and devices are shown in block diagram form in order to avoid unnecessarily obscuring the present invention.

FUNCTIONAL OVERVIEW

The PAV Utility

The pre-execution analysis and verification utility for shell scripts, hereafter referred to as the PAV utility, is a utility that acts as a shell script verifier and checker. The verification and checking may be performed to ensure that a shell script conforms to certain syntactic and/or semantic structures and guidelines, as well as certain coding organizational structures and guidelines. Verification for adherence to these structures and guidelines can improve programming practices, readability and maintainability.

A pre-execution analysis and verification (PAV) utility for shell scripts is provided. In one embodiment, the PAV utility verifies that a shell script adheres to one or more syntactic, semantic, and/or coding organizational guidelines and standards. In certain embodiments, PAV utility parses a shell script and performs static checks to determine whether the script is syntactically correct. The PAV utility may also provide information as to potential errors due to certain coding constructs by performing checks in order to ensure that the script adheres to coding organizational guidelines and/or standards.

In addition to verification of adherence to syntactic and coding construct guidelines, in certain embodiments, the PAV utility for verifies that a shell script adheres to certain semantic guidelines. For example, the PAV utility may report unused variables, redundant code, non-terminating loops, incorrect usage, undesirable side effects in addition to other semantic errors.

In one embodiment, the PAV utility 101 comprises a Shell Grammar module 102 and a Guideline Verifier module 103. In this example, the shell grammar module 102 performs syntax verification of a shell script and reports errors if the shell script does not adhere to syntactic guidelines. Alternatively, the Guideline Verifier module 103 performs semantic and coding guideline verification checks to verify that the shell script conforms to certain semantic guidelines.

The Shell Grammar Module

In general, a shell script language is defined by a set of grammar rules. Syntactic errors in shell scripts can be avoided by verifying that the script adheres to a set of pre-defined grammar rules and/or standards. For example, for the "Bourne Shell", a set of rules define a syntax that must be followed to generate a valid Bourne Shell script command. In one embodiment, the PAV utility performs a syntax verification check to verify that a shell script adheres to Bourne shell script syntax standards. In this example pre-execution verification for syntactic correctness is performed by a shell grammar module. First, the shell grammar module sets a flag to indicate that commands are to be read and not executed. Then, the shell script input must be verified against grammar rules for the shell.

COMPONENTS OF THE SHELL GRAMMAR MODULE

The Parser and Error Routine Modules

Figure 2:
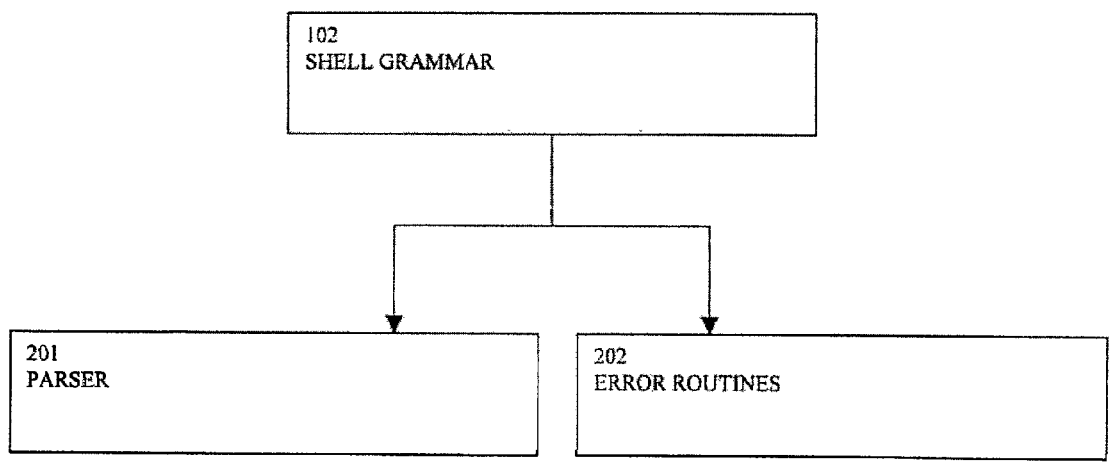
FIG. 2 is a high-level block diagram of an embodiment illustrating the join details of the shell grammar module of FIG. 1.

In certain embodiments, (as illustrated in FIG. 2), the shell grammar module 102 is configured as two modules, a parser module 201 which is a program that understands the grammar, and an error routines module 202 which reports errors when parsing fails. In one embodiment, the parser module 201 verifies an input script against grammar rules for the shell, and if parsing fails, error routines are invoked by an error routine module. In one embodiment, the parser module 201 is a program which understands the grammar of the shell and is responsible for performing syntax verification. The error routine module 202 reports if parsing has failed, and identifies the syntactical error responsible for the parsing failure. In one embodiment, parser module 201 performs the syntactic verification executing a parser module that breaks a stream of input characters from a shell script into various tokens. Each of the tokens then can be further reduced based on the language rules as applied to the shell input (further detailed in FIG. 3 and under the heading below, "Elements of the General Structure of a Shell Script"). Error routines 202 are invoked when the parser is not able to reduce a stream of tokens as per the language's rules.

ELEMENTS OF THE GENERAL STRUCTURE OF A SHELL SCRIPT

Basic Structure of a Shell Script

Figure 3:
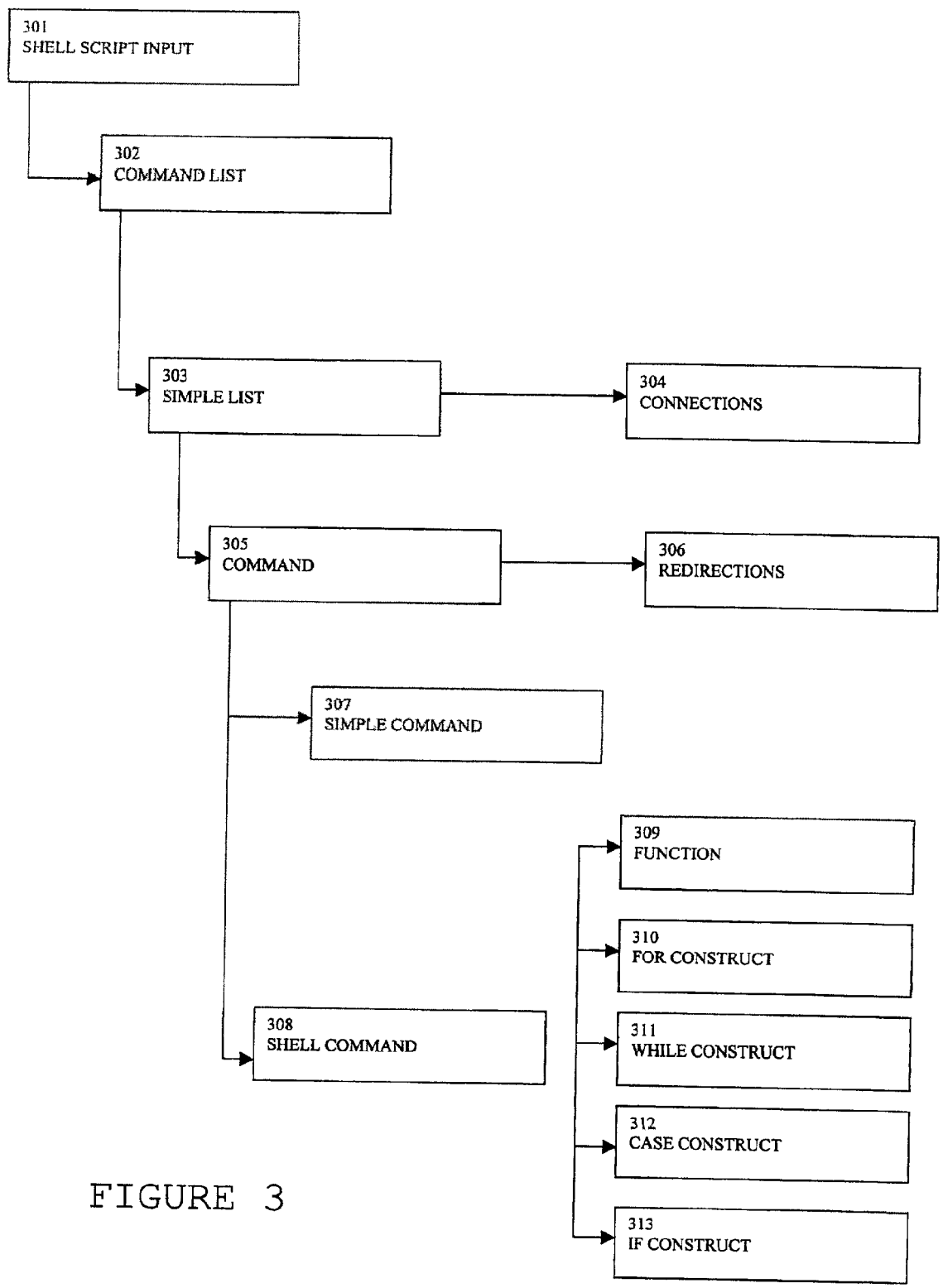
FIG. 3 is a high-level block diagram of an embodiment illustrating the general structure or grammar of a shell script.

The basic structure of a shell script is comprised of a simple list of commands which verify grammar for the shell. For example, the basic structure of a shell script can be represented by the example of FIG. 3. As previously described, parser module 201 verifies the input of a shell script 301 against the grammar for the shell as illustrated in FIG. 3. The elements of the general structure of a shell script in FIG. 3 represent typical "Bourne Shell" grammar which are rules for the shell language. Shell commands can be stored in a file, which can be executed when required. A file containing shell commands is known as a script. In this example, FIG. 3 is a block diagram that represents the general structure of a shell script.

A command-list 302 is a sequence of one or more simple commands separated or terminated by a new line or semicolon. Reserved words like "do" and "done" are only recognized following a new line or semicolon. The command list module 302 is a pattern that comprises simple lists.

The simple-list component 303 is a pattern that comprises of a set of commands joined by connections. In one embodiment, the simple list 303 shell script consists of a list of commands. These command-lists can be broken down into "simple-lists". The Connections component 304 contains Patterns like '|'. The shell interprets the words it reads according to a base language. For example, if a line is read in which the first word of the line (or after a control operator) is not a reserved word, then the shell will recognize the line as a simple command. Alternatively, the shell will recognize the line as a complex command or some other special construct. The Command component 305 could be either a simple command or a shell command.

Redirections components 306 are used to re-direct where a command reads its input or sends its output. In general, redirections open, close, or duplicate an existing reference to a file. The redirections component 306 provides an input of the pattern '>', '>>', '<', '<<', '>&'. The overall format used for redirection is: "[n] redir-op file".

Where the "redir-op" parameter is one of the redirection operators mentioned previously and the [n] parameter is an optional number, as in '3' (not '[3]'), that refers to a file descriptor. The following is an example list of some possible redirection operations.

[n]>file —Redirect standard output (or n) to file.
[n]>|file —Same, but override the -C option.
[n]>>file —Append standard output (or n) to file.

[n]<file —Redirect standard input (or n) from file.
[n1]<&n2 —Duplicate standard input (or n1) from file descriptor n2.
[n]<& —Close standard input (or n).
[n1]>&n2 —Duplicate standard output (or n) from n2.
[n]>& —Close standard output (or n).
[n]<>file —Open file for reading and writing on standard input (or n).

Simple commands are straight UNIX commands that exist regardless of the surrounding shell environment. For example, commands such as "cat" or "ls" are simple commands. The Simple Command module 307 describes a simple command. In certain embodiments, when a simple command is recognized, the shell performs the following actions:

1) Leading words of the form "name=value" are stripped off and assigned to the environment of the simple command. Redirection operators and their arguments (as described below) are stripped off and saved for processing.
2) The remaining words are expanded as described in the section called "Expansions", and the first remaining word is considered the command name and the command is located. The remaining words are considered the arguments of the command. If no command name results, then the "name=value" variable assignments recognized in 1) affect the current shell.

The components of the Shell Command module 308 are further described by the Control Structures modules 304 with components as featured in FIG. 3. The flow of execution for the shell is controlled by the flow control structures 309–313, which are described in further detail below.

Control Structures

In certain cases, a shell function may be considered similar to a shell script since they are both capable of storing commands However, a shell function is stored in memory once it is loaded from a script. Shell functions are declared in the ".profile" or in scripts. Functions can be removed from memory with the unset command. The general syntax for a function is:

```
function-name( )
{
commands
.
.
.
}
```

Like shell scripts functions accept arguments in the same manner. For example:

```

findarchive( )
{
for file in $1/*.a;do
nm $file | egrep "^$1|$2"
done
}
findarchive/usr/lib sqrt
```

The function "findarchive" accepts two arguments; the name of a directory where archive files (.a) are kept and the name of a routine to search for in all archive files. The "FOR" loop is used to loop through all the archives in the directory. The "nm" command lists all the archived symbols (routines, functions etc.). The "egrep" command displays all the lines containing a particular symbol and lines beginning with the directory name (the complete pathname of each archive).

The FUNCTION control structure 309 describes an input of the structure, for example:

```
<VariableName>( )
{
<Commands>
}
```

The FOR construct of module 310 describes a statement FOR which performs a loop executing the commands block for each of the specified items. For each loop, the iterative variable assumes the value of the item that follows in the specified order. The FOR statement can be interrupted with a break or continue statements. The BREAK statement terminates the loop and resumes execution on the statement after the end statement. The CONTINUE statement transfers control to the end statement which will continue the loop. For EXAMPLE:

```

for file in *.a
do
   echo $file
   nm $file | grep gamma
done
```

The WHILE construct of module 311 describes the statement WHILE which performs a loop executing the commands block while test-command is true. The format of the while statement may be as follows:

```
while test-command
do
   commands
done
```

The CASE construct implements a multiple branch decision mechanism. The chosen branch is selected based on the comparison between the string expression and each pattern. The CASE construct module 312 describes an input that follows the pattern:

```
case<variable>in
   <pattern1>)<commands>
   ;;
   <pattern2>)<commands>
   ;;
   <patternN>)<commands>
   ;;
esac
```

For example:

```

echo "Answer YES or NO:"
read answer
case "$answer" in
  YES)
  echo "Answer is YES"
  ;;
  NO)
  echo "Answer is NO"
  ;;
  *)
  echo "Answer is neither YES or NO"
  ;;
esac
```

The IF construct of module 313 describes an input of the type:

```
if <expression> then
  <Commands>
else/elif
  <Commands>
fi
```

As exemplified, the flow of execution for the shell is controlled by the control structures. In this example, modules 309–313 perform this function.

The Guideline Verifier

Figure 4:
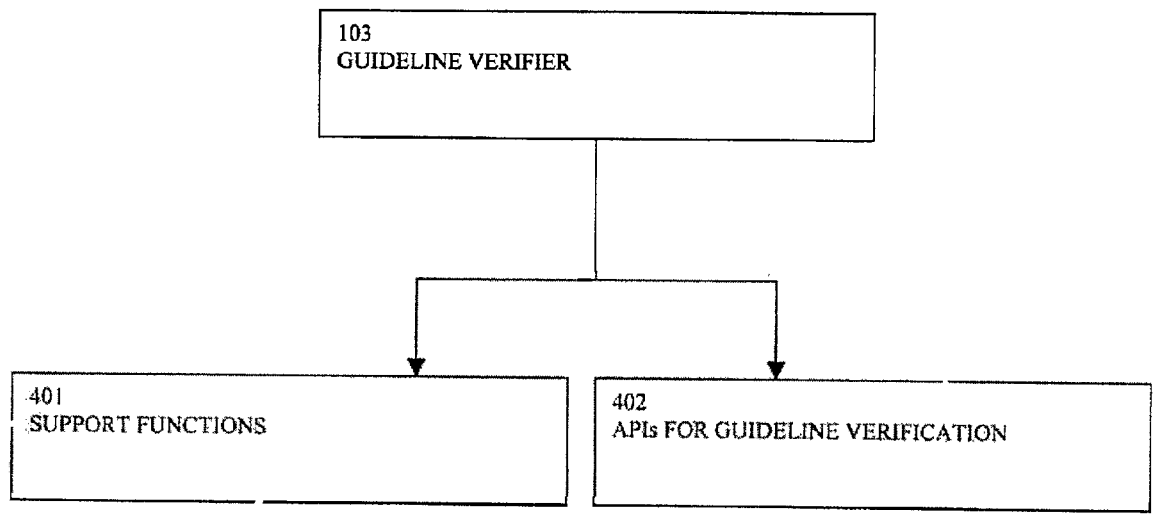
FIG. 4 is a high-level block diagram of an embodiment illustrating the structure of the guideline verifier module of FIG. 1.

As illustrated in FIG. 1, the Guideline Verifier 103 module performs semantic and/or coding organizational standards and guideline verification on the shell script. In certain embodiments, guideline verifier 103 may be configured as two modules: a set of application programming interface APIs for guideline verification module and a set of one or more support function modules. As illustrated in FIG. 4, the guideline verifier 103 may be comprised of a support functions module 401 and guideline verifier APIs module 402.

Figure 5:
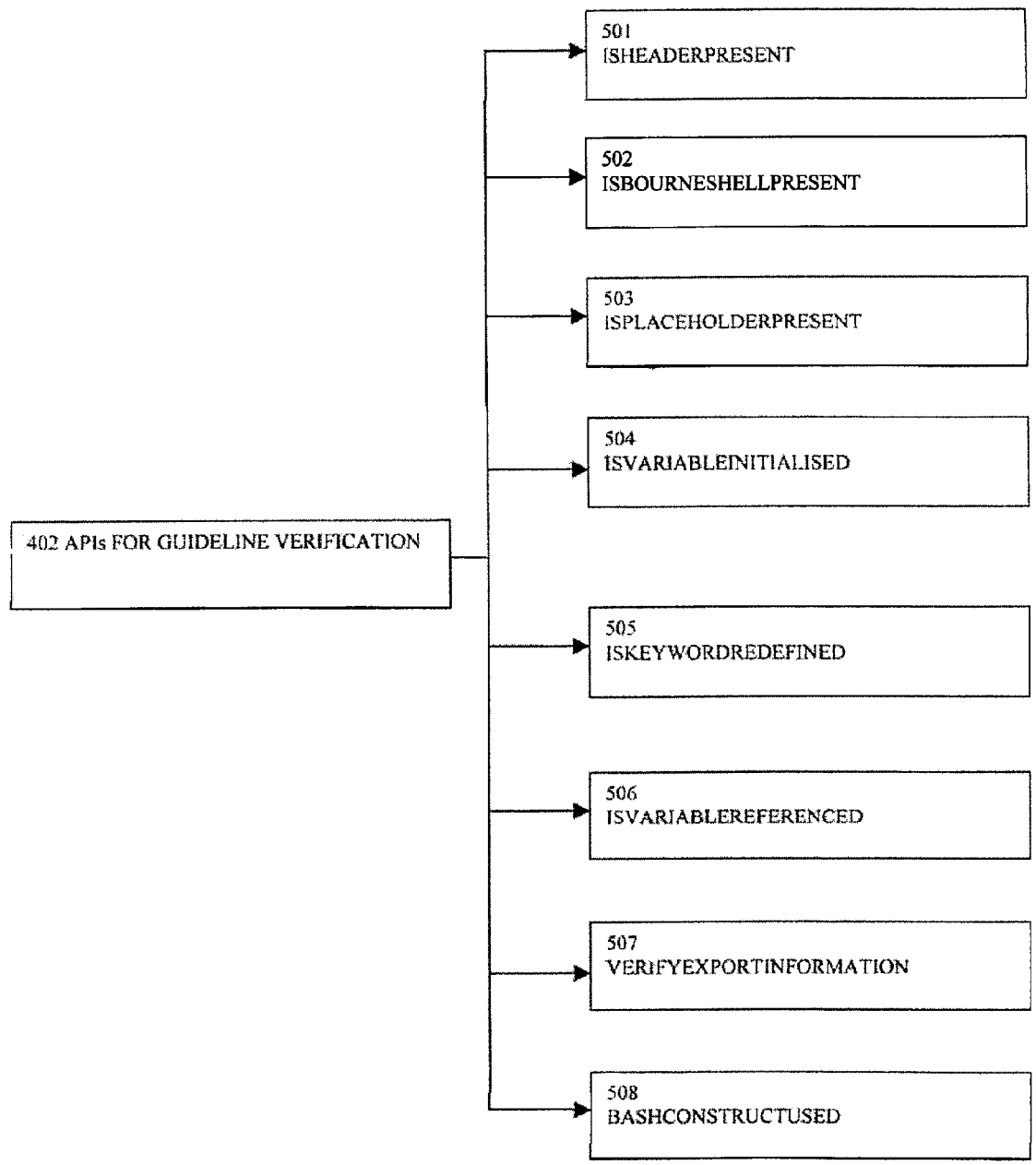
FIG. 5 is a high-level block diagram of an embodiment illustrating the various application-programming interface (APIs) for guideline verification.

In certain embodiments, the guideline verifier 103 is comprised of various APIs, which in turn perform semantic checks. For example, the Guideline Verifier module 103 may include some or all of the following semantic checks:
  A Variable Initialization check
  A Presence of header check
  A Use of bourne shell check In certain embodiments, the guideline verifier module 103 may also perform coding guideline verification checks. For example, the guideline verifier module 103 may perform certain coding guideline verification checks which may include, for example:
  A Usage of shell check
  A Presence of Header check
  An Initialization of shell variables check
  A Referencing shell variables at least once check
  A Non-redefinition of the keyword check
  A Presence of a placeholder check
  A Non-usage of bash constructs check
  A Presence of environment variable index check FIG. 5 provides an example of various APIs (501–508) that may be associated with verification mechanisms for performing semantic checks in the PAV utility.

The Guideline Verifier APIs and Semantic Checking

In certain embodiments, the PAV utility identifies semantic errors that may be contained in a shell script. FIG. 5 illustrates various APIs that may be associated with Guideline Verification 402 for performing semantic checks in the PAV utility.

For example, some or all of the following APIs may be provided for performing semantic checks on a shell script.
1. A Check for usage of bourne shell, the IsBourneshellPresent module 502, which verifies the presence of the bourne shell. This module checks if the pattern #!/bin/sh is present at the beginning of a shell-script. If not, gives a warning.
2. A Check for a place-holder, namely "", for variables, the IsPlaceholderPresent module 503. For example, when a variable VAR is referred, it should be referred as "$VAR". The IsPlaceHolderPresent module 503 Checks if "" or ' ' is present when a variable is referenced. If not, indicates an error.
3. A Check for initialization of variables, the IsVariableInitialized module 504 checks to see if a variable has an initial value. If the IsVariableInitialized module determines that there is no initial value, a warning is issued.
4. A Check for redefinition of keywords, the IsKeywordRedefined module of 505. Which includes verification checks for keywords such as "break" or "continue" which should not be redefined.
5. A Check if every variable is referenced at least once. The IsVariableReferenced module of 506 which verifies if there is any pattern with $VAR in the shell script code. The IsVariableReferenced module 506 Checks to see if all initialized variables are getting referenced at least once or not.
6. A Check of the export variables, the VerifyExportInformation module of 507, cross checks the exported variables with the information given in the header to find if there is a one-to-one mapping. The VerifyExportInformation module 507 checks this information against the one provided in the header. If they do not match, it flags a warning.
7. A Use of bash constructs module, the BashConstructUsedModule of 508, checks whether constructs like "select" are being used. If yes, a warning is issued.

The APIs for guideline verification form the core of checks for coding guidelines. These APIs incorporate and identify coding guidelines as shown in FIG. 5.

Support Functions

In one embodiment, support functions 401 are linked to the shell grammar module 102 and the parser module 201. For example, the parser module 201 may evoke IsVariableInitialized support functions (module 401) when the parser recognizes a reference to a variable, for example, in response to detecting the pattern $VARNAME. Another example of a support function is for header verification. The header of the PAV utility is a set of comments in a specified format. The header is generally included for maintenance readability reasons and typically includes the following information:
  Copyright
  File name
  Description
  Usage
  Arguments
  Return values Variables are exported another shell scripts and used in this script
Variables are exported on the shell script
Notes
Details the modifications
Details on creation Another example of support functions is the header routine of the support functions module 401. The header routine of the support functions module includes functions that are used internally by the IsHeaderPresent API module 501. Other support functions provide facilities used by the rest of the APIs.

Automatic Header Generation and Command Line Option

In addition to performing the described checks, certain embodiments of the PAV utility may be configured to optionally perform automatic header generation and for accepting input using via a command line. In one example, as illustrated in FIG. 6, an Automatic Header Generation module 601 is provided that adds a header at the beginning of a given shell script using the available information. This may reduce the work of the programmers by providing a template in which the header details are filled in automatically. In one embodiment, a Command Line Operation 7 module (FIG. 7), sets appropriate flags, which allow programmers to manually turn "off "certain checks. For example, if the header verification is not required, an appropriate option may be used to turn the associated flag "off". In this manner, the condition may be ignored.

Example Input and Output of the PAV Utility

An example input and output of the PAV utility is provided below. The code provides an example of code that was executed against various shell scripts and that has been shown to perform appropriate checks in the specified manner.

Let us take a sample file -FindFiles.sh
1 #FindFiles.sh
2 echo Shell script to find files containing sh
3
4 echo $PATH
5 echo "$PS!"
6 j=0
7 for I in 'find . -type f|grep sh';
8 do
9 j=$j+1;
10 echo File No. $j is $I;
11 done;
12 export j;

Output of the pre-execution analysis and verification utility for shell scripts, PAV Utility:

$PAV FindFiles.sh
  # PAV FindFiles.sh
  Setting Environmental Variables . . .
  Error in the Header
  Error in the Header in FindFiles.sh
  Line number 4: Warning —Place Holder not present, PATH
  Line number 9: Warning —Place Holder not present, j
  Line number 10: Warning —Place Holder not present, j
  Line number 10: Warning —Place Holder not present, I
  Verifying whether variables are referenced or not . . .
  Warning: Bourne shell not present
  Verifying Export Information . . .
  Warning, Exported variable not included in Header: j
  Warning . . . . Header does not contain enough information about variables actually exported
  #

For automatic Header Generation.

$PAV -H+A FindFiles.sh
  # PAV -H+A FindFiles.sh
  Line number 4: Warning —Place Holder not present, PATH
  Line number 9: Warning —Place Holder not present, j
  Line number 10: Warning —Place Holder not present, j
  Line number 10: Warning —Place Holder not present, I
  Verifying whether variables are referenced or not . . .
  Warning: Bourne shell not present
  #

The option A+ generates the header automatically and adds it to the beginning of the shell script by name FindFiles.sh.osh. This provision may reduce the work of the programmers by providing a template in which header details can be filled up by the programmers.

FindFiles.sh.osh has the Header template incorporated

```
!/bin/sh
(COPYRIGHT) Copyright © Oracle Corporation. All rights reserved
(/COPYRIGHT)
(FILENAME)
findfiles.sh.osh (/FILENAME)
(DESCRIPTION)
Description here
(/DESCRIPTION)
(USAGE)
Usage Here
(/USAGE)
(ARGUMENTS)
Arguments Here
(/ARGUMENTS)
(RETURNS)
Return Values Here
(/RETURNS)
(IMPORT)
(/IMPORT)
(EXPORT)
(VARIABLE)
j
(/VARIABLE)
(/EXPORT)
(NOTES)
Notes Here
(/NOTES)
(MODIFIED)
Details of Modification Here
(/MODIFIED)
(CREATED)
Details of Creation Here
(/CREATED)
###########################################################

findfiles.sh
echo Shell script to find files containing sh
echo $PATH
echo "$PS1"
j=0;
    for i in 'find . -type f | grep sh';
do
    j=$j + 1;
    echo file No. $j is $i;
done;
export j;
```

Sample output for /etc/rc0. $PAV/etc/rc0>Output_rc0
  Error in the Header
  Error in Header in /etc/rc0
  Line number 53: Warning —Place Holder not present, f
  Line number 53: Warning —Place Holder not present, f
  Line number 61: Warning —Place Holder not present, f
  Line number 62: Warning —Place Holder not present, f
  Line number 63: Warning —Place Holder not present, f
  Line number 64: Warning —Place Holder not present, f
  Line number 72: Warning —Place Holder not present, f
  Line number 73: Warning —Place Holder not present, f
  Line number 74: Warning —Place Holder not present, f
  Line number 75: Warning —Place Holder not present, f
  Verifying whether variables are referenced or not . . .
  Verifying export information . . .
  Warning. Exported variable not included in Header: _INIT_UTS_PLATFORM
  Warning. Exported variable not included in Header: _INIT_UTS_ISA
  Warning. Exported variable not included in Header: _INIT_UTS_MACHINE
  Warning. Exported variable not included in Header: _INIT_UTS_VERSION
  Warning. Exported variable not included in Header: _INIT_UTS_RELEASE
  Warning. Exported variable not included in Header: _INIT_UTS_NODENAME
  Warning. Exported variable not included in Header: _INIT_UTS_SYSNAME
  Warning. Exported variable not included in Header: _INIT_PREV_LEVEL
  Warning. Exported variable not included in Header: _INIT_RUN_NPREV
  Warning. Exported variable not included in Header: _INIT_RUN_LEVEL
  Warning. Header does not contain enough information about variables actually exported

PLATFORM INDEPENDENCE

In certain embodiments lex and yacc libraries are used in the PAV utility. Lex stands for Lexical Analyzer Generator which helps write programs whose control flow is directed by instances of regular expressions in the input stream. Yacc stands for Yet Another Compiler—Compiler which is a general tool for describing the input to a computer program. Since the PAV utility can be compiled and run in any UNIX environment which has lex and yacc libraries, issues of portability do not arise.

In the foregoing specification, the invention has been described with reference to specific embodiments thereof. It will, however be evident that various modifications and changes can be made thereto without departing from the broader spirit and scope of the invention. For example, the reader is to understand that the specific ordering and combination of modules and processes described herein is merely illustrative, and unless specifically indicated otherwise the invention can be performed using different or additional modules or process functions, or a different combination or ordering of modules and process functions. The specification and drawings are, accordingly, to be regarded in an illustrative rather than restrictive sense.

What is claimed is:

1. A method for verifying shell scripts, the method comprising the computer-implemented steps of:
  storing, on a computer-readable medium, semantic guidelines that indicate rules, distinct from any rules imposed by the programming language in which the shell scripts are written, about what the scripts should or should not contain, wherein the rules indicated in the semantic guidelines include one or more rules which, if not followed in the shell script, do not result in errors when the shell script is executed; and,
  prior to executing a shell script, one or more processors of a computer system performing one or more syntactic verification checks on said shell script, wherein said one or more syntactic verification checks verify conformance of said shell script to a set of syntactic guidelines; and,
  performing one or more semantic verification checks on said shell script, wherein said one or more semantic verification checks verify conformance to the rules indicated in said semantic guidelines.

2. The method of claim 1, further comprising the step of:
  prior to executing a shell script,
    performing one or more coding organizational guideline verification checks, wherein said guideline verification checks verify conformance of said shell script to a set of one or more coding organizational guidelines.

3. The method of claim 2, further comprising a shell grammar verification mechanism that is responsive to said shell script, wherein said shell grammar verification mechanism comprises a plurality of syntactic verification checks which when invoked perform verification of conformance of said shell script to a plurality of syntactic guidelines for said shell script.

4. The method of claim 1, further comprising a guideline verifier mechanism that is responsive to said shell script, wherein said guideline verifier mechanism comprises a plurality of semantic verification checks which when invoked perform verification of conformance of said shell script to a plurality of accepted semantic guidelines for said shell script.

5. The method of claim 4, wherein said guideline verifier mechanism performs a plurality of coding organizational guideline verification checks on said shell script for conformance to a plurality of accepted coding organizational guidelines for said shell script.

6. The method of claim 3, wherein said shell grammar verification mechanism further comprises:
  a parser mechanism responsive to said shell script which performs parsing of
  said shell script; and
  an error routine mechanism responsive to said shell script which performs error detection and identification for said shell script.

7. The method of claim 6, wherein said parser mechanism further comprises:
  a plurality of verification checks which when invoked perform a plurality of one or more verification checks on said shell script in order to verify conformance of said shell script to a plurality of one or more accepted set of grammar rules for said shell.

8. The method of claim 6, wherein said error routines mechanism further comprises:
  a plurality of error routines responsive to said shell script which when invoked identify parsing errors and report if parsing has failed in said shell script.

9. The parser mechanism of claim 6 wherein:
said parser mechanism performs syntactic verification by breaking a stream of input characters from said shell script into a plurality of tokens; and,
said plurality of tokens are further reduced based on a set of grammar rules that are associated with said shell script.

10. The method of claim 6, wherein:
said error routines are invoked when said parser mechanism is unable to reduce said plurality of tokens as per the said shell script set of grammar rules.

11. The method of claim 4, wherein said guideline verification mechanism further comprises:
a plurality of support functions responsive to shell script which support a plurality of checks for verification of conformance to a plurality of accepted semantic guidelines and coding organizational guidelines and standards for said shell script; and,
a plurality of API functions which perform checks for guideline verification by performing a plurality of checks for verification of conformance to a plurality of accepted semantic guidelines and coding organizational guidelines and standards for said shell script.

12. The method of claim 4, wherein said guideline verification mechanism further comprises:
a check for usage of a shell.

13. The method of claim 4, wherein said guideline verification mechanism further comprises:
a check for presence of a Header.

14. The method of claim 4, wherein said guideline verification mechanism further comprises:
a check for an initialization of shell variables.

15. The method of claim 4, wherein said guideline verification mechanism further comprises:
a check for referencing shell variables at least once.

16. The method of claim 4, wherein said guideline verification mechanism further comprises:
a check for non-redefinition of keywords.

17. The method of claim 4, wherein said guideline verification mechanism further comprises:
a check for the presence of placeholders.

18. The method of claim 4, wherein said guideline verification mechanism further comprises:
a check for non-usage of bash constructs.

19. The method of claim 4, wherein said guideline verification mechanism further comprises:
a check for presence of environmental variables index.

20. A computer-readable medium carrying one or more sequences of instructions for verifying shell scripts, the method comprising the computer-implemented steps of:
storing, on a computer-readable medium, semantic guidelines that indicate rules, distinct from any rules imposed by the programming language in which the shell scripts are written, about what the scripts should or should not contain, wherein the rules indicated in the semantic guidelines include one or more rules which, if not followed in the shell script, do not result in errors when the shell script is executed; and,
prior to executing a shell script, one or more processors of a computer system performing one or more syntactic verification checks on said shell script, wherein said one or more syntactic verification checks verify conformance of said shell script to a set of syntactic guidelines; and,
performing one or more semantic verification checks on said shell script, wherein said one or more semantic verification checks verify conformance to the rules indicated in said semantic guidelines.

* * * * *